US008486500B2

(12) United States Patent
Austreng et al.

(10) Patent No.: US 8,486,500 B2
(45) Date of Patent: Jul. 16, 2013

(54) FLAT BOTTOM BAG

(75) Inventors: Andrew Austreng, DePere, WI (US); Cori K. Kohl, Appleton, WI (US)

(73) Assignee: Coating Excellence International LLC, Wrightstown, WI (US)

( * ) Notice: Subject to any disclaimer, the term of this patent is extended or adjusted under 35 U.S.C. 154(b) by 593 days.

(21) Appl. No.: 12/663,730

(22) PCT Filed: Jun. 19, 2008

(86) PCT No.: PCT/US2008/067478

§ 371 (c)(1), (2), (4) Date: May 14, 2010

(87) PCT Pub. No.: WO2008/157681

PCT Pub. Date: Dec. 24, 2008

(65) Prior Publication Data

US 2010/0221464 A1 Sep. 2, 2010

Related U.S. Application Data

(60) Provisional application No. 60/945,173, filed on Jun. 20, 2007, provisional application No. 60/968,718, filed on Aug. 29, 2007.

(51) Int. Cl.
*B32B 1/00* (2006.01)
*B32B 38/00* (2006.01)

(52) U.S. Cl.
USPC .......... 428/34.3; 428/34.1; 383/123; 156/227

(58) Field of Classification Search
USPC ................. 428/34.1, 34.3; 156/227; 383/120, 383/121, 123, 124, 117
See application file for complete search history.

(56) References Cited

U.S. PATENT DOCUMENTS

| | | | | |
|---|---|---|---|---|
| 3,990,626 | A | 11/1976 | Goodrich | |
| 4,008,850 | A | 2/1977 | Goodrich | |
| 5,195,829 | A * | 3/1993 | Watkins et al. | 383/100 |
| 6,095,687 | A * | 8/2000 | Dematteis | 383/104 |

(Continued)

FOREIGN PATENT DOCUMENTS

| | | |
|---|---|---|
| CA | 775426 | 1/1968 |
| CA | 875950 | 7/1971 |

OTHER PUBLICATIONS

International Preliminary Report on Patentability, dated Dec. 22, 2009, in PCT/US2008/067478.

*Primary Examiner* — Gwendolyn Blackwell
*Assistant Examiner* — Yan Lan
(74) *Attorney, Agent, or Firm* — Duane Morris LLP

(57) ABSTRACT

A bag and a method of making a bag having a first panel, a second panel and gusseted side panel, and each side panel having a tuck forming, folding geometry with folds intersecting at junctions with longitudinal folds at the first panel and second panel, and having an apex intersecting the center gusset fold, the apex and the junctions being intersected with respective transverse creases, at least a first region of the bag being flattened, a turned back portion of the first panel being turned back on itself and folded along one of the transverse creases, and the first region being pivoted and flattened against the turned back portion of the first panel An end of the bag is covered with a tamper evident structure having an adhesive tape with or without a tamper evidence security device and with or without a tear strip

21 Claims, 6 Drawing Sheets

U.S. PATENT DOCUMENTS

| | | | | |
|---|---|---|---|---|
| 6,367,976 | B1 | 4/2002 | Bannister | |
| 6,800,051 | B2 | 10/2004 | Koen | |
| 7,731,425 | B2 | 6/2010 | Lin et al. | |
| 2002/0021844 | A1 | 2/2002 | Rusert et al. | |
| 2004/0223665 | A1 * | 11/2004 | Blohowiak et al. | 383/89 |
| 2007/0048480 | A1 | 3/2007 | Lavosky | |
| 2007/0082158 | A1 * | 4/2007 | Nowak | 428/36.1 |
| 2008/0292223 | A1 | 11/2008 | Bannister | |
| 2009/0159192 | A1 | 6/2009 | Bannister | |
| 2010/0029455 | A1 | 2/2010 | Skopek et al. | |

* cited by examiner

FLAT BOTTOM BAG

CROSS REFERENCE TO RELATED APPLICATIONS

The present application claims the benefit under 35 USC § 119 of PCT/US2008/067478 and further claims the benefit of U.S. Provisional Application No. 60/945,173 filed 20 Jun. 2007, and further claims the benefit of U.S. Provisional Application No. 60/968,718 filed 29 Aug. 2007.

FIELD OF THE INVENTION

The present invention relates to a bag and a method of manufacture thereof, wherein the bag is in a folded flat configuration and is capable of expanding into bag with a flat bottom.

BACKGROUND

U.S. Pat. No. 5,840,002 discloses a bag having gusseted side panels defined by longitudinal folds and a longitudinal center gusset fold. A scoring apparatus is disclosed to create the longitudinal folds. Diagonal fold lines create a flat bottom.

U.S. Pat. No. 4,273,550 discloses a scoring apparatus for folding a gusseted bag. The bag has folded corner tucks that are unfolded when the bag is expanded.

SUMMARY OF THE INVENTION

A bag comprises, a first panel, a second panel and gusseted side panels having longitudinal folded edges and a center gusset fold. Each side panel has a tuck forming, folding geometry intersecting at junctions with the longitudinal folded edges, and an apex intersecting the center gusset fold. A first transverse crease intersects approximately the apex. A second transverse crease intersects approximately the respective junctions. A first region of the bag is flattened, wherein the first region extends between a bottom end of the bag and the first transverse crease. A second region extends between the bottom end of the bag and the second transverse crease. A turned back portion of the first panel in the second region is turned back on itself and folded along the first transverse crease. The first region is pivoted and flattened against the turned back portion of the first panel.

According to an embodiment of the invention, a flat bottom of the bag is formed by the panels being spread apart from one another, turned under along the second transverse crease, and folded along the second transverse crease.

Other embodiments of the bag comprise a tamper evident structure, wherein the tamper evident structure comprises an adhesive tape with or without a tear strip. Another embodiment of the tamper evident structure comprises, an adhesive tape and a security device with or without a tear strip. An embodiment of the security device comprises, a transferable substance leaving a residue when the adhesive tape is removed, or a hologram.

Other embodiments of the bag comprise, a first region of the bag being flattened, wherein the first region extends between a top end of the bag and a first transverse crease. A second region extends between the top end of the bag and a second transverse crease. A turned back portion of the first panel in the second region is turned back on itself and folded along the first transverse crease. The first region is pivoted and flattened against the turned back portion of the first panel.

According to an embodiment of the invention, a flat top of the bag is formed by the panels being spread apart from one another, turned under along the second transverse crease, and folded along the second transverse crease.

Other embodiments of a top of the bag comprise a tamper evident structure, wherein the tamper evident structure comprises an adhesive tape with or without a tear strip. Another embodiment of the tamper evident structure comprises, an adhesive tape and a security device. An embodiment of the security device comprises, a transferable substance leaving a residue when the adhesive tape is removed, or a hologram. Another embodiment of the tamper evident structure comprises, an adhesive tape, a security device and a tear strip.

DETAILED DESCRIPTION

Figure 1:
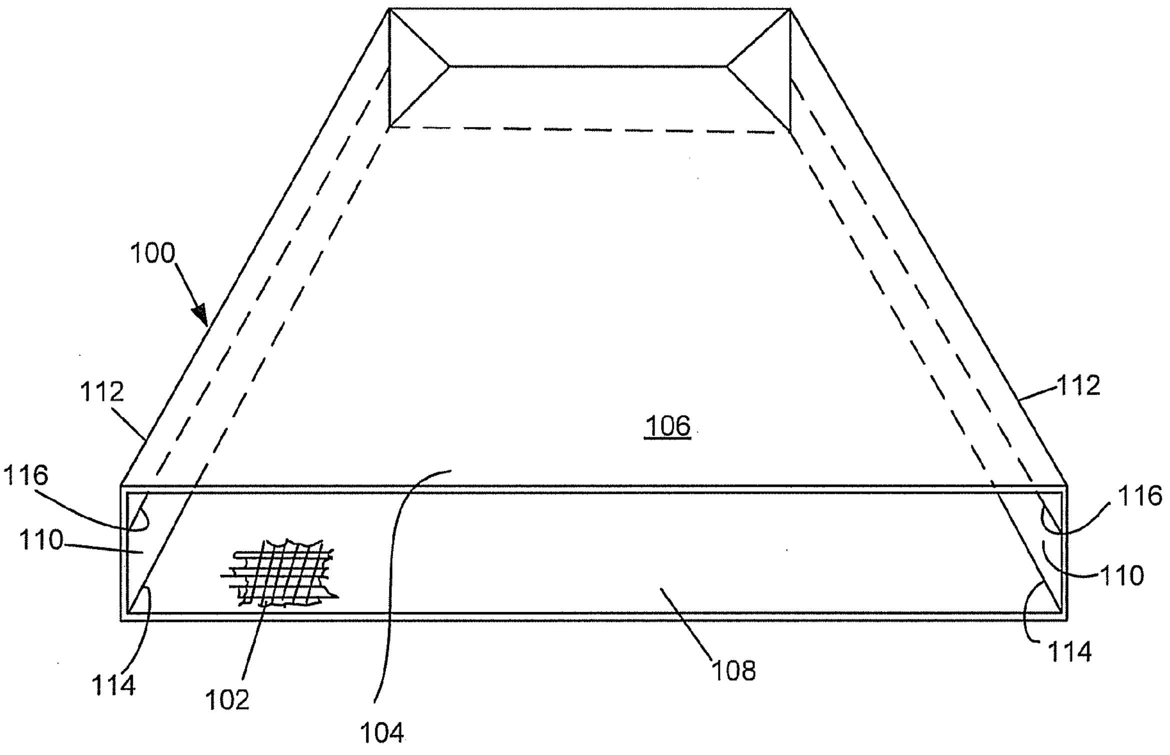
FIG. 1 is a schematic view of a laminated continuous tube to be fabricated into one or more bags.

FIG. 1 discloses a laminated tube 100 to be fabricated into one or more bags. The tube 100 has a woven inner layer 102, a portion of which is illustrated to comprise a tight basket weave of thin, flexible, elongated strips of a polymeric material, for example, polypropylene. The inner layer 102 advantageously comprises a woven seamless tube that is highly flexible due to the weave. The laminated tube 100 has at least one outer layer 104 of a printable polymeric material, for example, polypropylene film that is capable of being printed with graphics using water based pigments or solvent based pigments. After printing the outermost layer 104, each outer layer 104 and the woven inner layer 102 are laminated, for example, by applying a solventless adhesive or solvent based adhesive between the layers to be laminated, and applying heat and pressure to laminate each outer layer 104 and the inner layer 102 and form a continuous laminated tube 100.

As disclosed in FIG. 1, the laminated continuous tube 100 further comprises a first panel 106, a second panel 108 and two gusseted side panels 110, wherein each side panel 110 joins the first panel 106 and the second panel 108 along respective longitudinal edge folds 112, 114, and wherein each side panel 110 comprises a longitudinal center gusset fold 116. The first panel 106 comprises either a front panel or a back panel.

To form the longitudinal folds 112, 114, 116 as creases, a known scoring apparatus applies the creases along score lines. The creases comprise localized inelastic material strain, which provides locally increased flexibility that allows the material to flex locally along the creases and fold along the creases. Further details of a scoring apparatus are disclosed in U.S. Pat. No. 4,273,550 and U.S. Pat. No. 5,840,002.

Figure 2A:
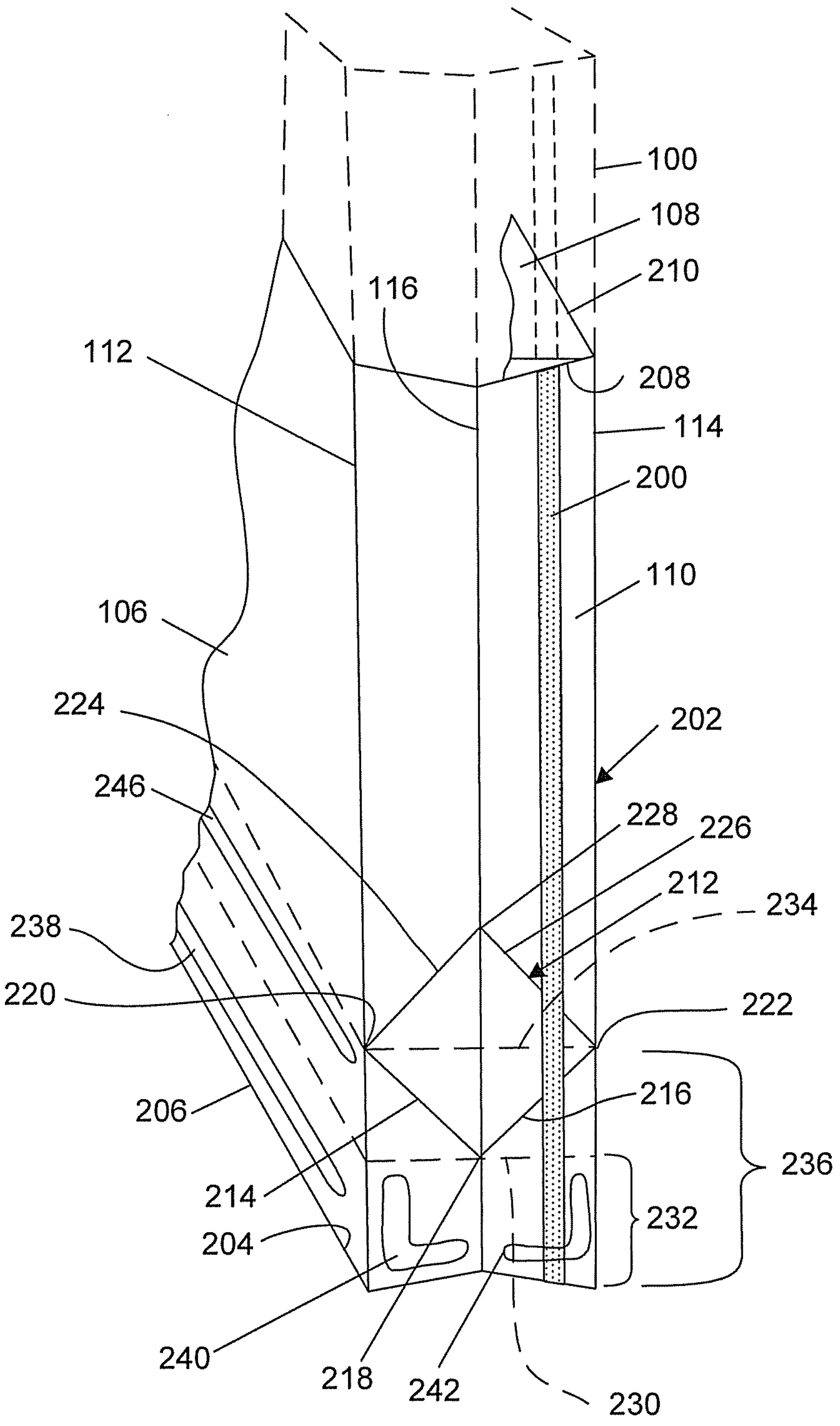
FIG. 2A is a schematic view of a bag being fabricated from the tube disclosed by FIG. 1.

FIG. 2A discloses one of the two gusseted side panels 110, which are of duplicate construction. Accordingly, one gusseted side panel 100 will now be described in a manner to apply to each gusseted side panel 110 having the duplicate construction.

FIG. 2A discloses the outermost layer 104 comprising two sheets of polymeric material that are seamed together along a corresponding seam 200 that extends continuously along a corresponding gusseted side panel 110. Similarly, the second side panel 110 of duplicate construction is provided with a corresponding seam 200 joining the same two sheets of polymeric material. Accordingly, the first panel 106 and the second panel 108 are seamless and provide a continuous surface for displaying printed graphics. Moreover, a bag while containing its contents is capable of being stacked and slid along the either panel 106, 108 unimpeded by, and without risking damage to, a seam 200.

According to a preferred embodiment of the invention, the woven layer 102 is fabricated with the longitudinal folds 112, 114, 116 prior to lamination, and each outer layer 104 is fabricated with similar longitudinal folds 112, 114, 116 prior to lamination. According to another embodiment of the invention, the longitudinal folds 112, 114, 116 are fabricated after lamination of the woven layer 102 with each outer layer 104. A preferred embodiment further comprises 10×10 per inch, 850 denier, woven polypropylene fabric, 16.5 lb/rm polypropylene extrudate, 70 ga polypropylene film, solventless adhesive compatible with polypropylene and ink. The film layers 104 are comprised of thermoplastic synthetic resins, including but not limited to, linear low density or linear high density polyethylene, polypropylene coated with a layer of polyethylene, metallocene, electron-beam-cured film, polyester, PLA, or thermoplastic polymers to which a degradable or compostable additive is added. The film layers 104 are either printed or reverse-printed using a flexographic or other printing method.

The woven layer 102 while flattened, is conveyed continuously through a lamination apparatus with a first sheet or film layer 104, and is laminated, by the application of heat and pressure, on one side to the first sheet or film layer 104, which are then turned over and conveyed continuously through another lamination apparatus with a second sheet or film layer 104, and thereby, a second side of the woven layer 102 is laminated with the second sheet or film layer 104. A melt bond is established by the melt state surfaces of the polypropylene-to-polypropylene layers 102, 104, or by the melt state surfaces of a solventless adhesive between the layers 102, 104, or by the melt state surfaces of other polymer material (polyethylene coating material) between the layers 102, 104, which laminates the layers together. Further, the two film layers 104 are melt bonded and laminated together where they overlap along the seams 200.

FIG. 2A discloses a bag 202 being fabricated from the continuous tube 100. A first transverse cut line 204, which defines the location where the continuous tube 100 is severed, and which defines the location of a bottom end 206 of the bag to be fabricated from the continuous tube 100. Further the continuous tube 100 has a second transverse cut line 208, which defines the location where the continuous tube 100 is to be severed, and which defines the location of a top end 210 of the bag 202 being fabricated from the continuous tube 100.

FIG. 2 discloses a tuck forming, folding geometry 212 fabricated in each gusseted side panel 110 near the bottom end 206. The folding geometry 212 comprises a first set of intersecting diagonal fold lines 214, 216 intersecting at a first apex 218 approximately on the center gusset fold line 116 and extending diagonally to respective junctions 220, 222 with the longitudinal folded edges 112, 114. The folding geometry 212 further comprises a second set of intersecting diagonal fold lines 224, 226 intersecting at a second apex 228 approximately on the center gusset fold line 116 and extending diagonally to the respective junctions 220, 222.

To form each folding geometry 212, a known scoring apparatus enters the open bottom end 206 of the bag 202 at the end of the continuous tube 100, and applies stress induced creases along score lines applied by a known scoring apparatus. The creases comprise localized inelastic material strain, which provides locally increased flexibility that allows the material to flex locally along the creases and form the folding geometry 212. According to an alternative embodiment, the folding geometry 212 is duplicated near a top end 210 of the bag 202 to be fabricated from the continuous tube 100, such that each gusseted side panel 110 has a folding geometry 212 near the bag bottom end 206, and a duplicate folding geometry 212 near the bag top end 210. The scoring apparatus is withdrawn after forming each folding geometry 212.

In FIG. 2A, according to an embodiment of the invention, each folding geometry 212 is fabricated on each gusseted side panel 110 while the bag 202 is part of the continuous tube 100.

A continuous production line performs a process of laminating with heat and pressure, followed by a process of scoring to fabricate each folding geometry 212. According to an alternative embodiment of the invention, each folding geometry 212 is fabricated on each gusseted side panel 110 after the bag 202 has been removed from the continuous tube 100 by severing along the cut lines 204, 208.

Figure 2B:
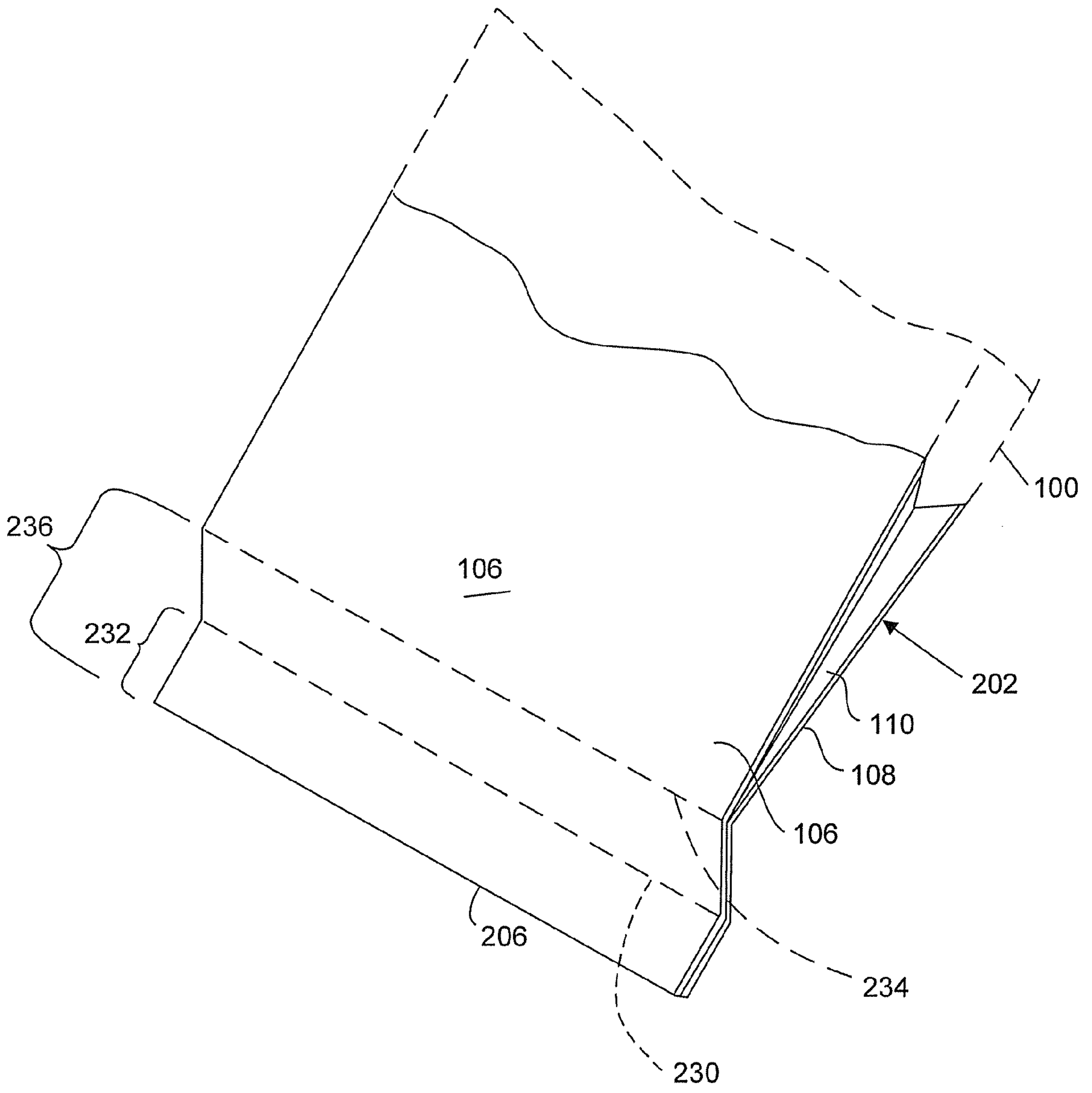
FIG. 2B is a schematic view of the bag disclosed by FIG. 2 at one stage of fabrication thereof.

In FIG. 2B, at least the bottom end 206 of the bag 202 is collapsed and folded flat by folding along the longitudinal folds 112, 114, 116. Another scoring apparatus applies a first transverse crease 230, FIG. 2B, wherein the first transverse crease 218 extends across the first panel 106, the second panel 108 and each gusseted side panel 110. The first transverse crease 230 defines a first region 232 of the bag 202 between the bottom end 206 of the bag 202 and the crease 230. In FIG. 2A, the first transverse crease 230 extends transversely across the bag 202, intersecting approximately the first apex 218. For example, the first transverse crease 230 is located approximately 2 inches from the bottom end 206.

The same scoring apparatus applies a second transverse crease 234, FIG. 2B. The second transverse crease 234 extends transversely across the bag 202, wherein the second transverse crease 234 extends across the first panel 106, the second panel 108 and each gusseted side panel 110. The second transverse crease 234 defines a second region 236 of the bag 202 extending between the bottom end 106 of the bag 202 and the crease 234. For example, the first transverse crease 230 is located approximately 4 inches from the bottom end 206. The second region 236 is wider than the first region 232 and extends over the first region 232. In FIG. 2A, the second transverse crease 234 intersects approximately the respective junctions 220, 222. In FIG. 2A, according to an embodiment of the invention, the transverse creases 230, 234 are fabricated while the bag 202 is part of the continuous tube 100. According to an alternative embodiment, the bag 202 is separated from the tube 100 before the transverse creases 230, 234 are fabricated.

According to another embodiment of the invention, the transverse creases 230, 234 are fabricated in a manner as described herein followed by fabricating each folding geometry 122 in a manner as described herein.

FIG. 2A discloses quantities of adhesive 238, 240, 242 applied along the first region 232 located between the bottom end 206 and the first crease 230. For example, the adhesive is commercially supplied in a caulking tube having a nozzle. The tube dispenses the adhesive through the nozzle by using a manual caulking tool or the equivalent machine applicator. The quantities of adhesive 238, 240, 242 comprise beads of adhesive drawn from the tube and applied to both the interior, inside surface of the bag and the exterior, outside surface along the first region 232. The beads of adhesive 238, 240, 242 are applied on the outside surface of the bag 202, as shown in FIG. 2, and are duplicated by being applied on the inside surface of the bag 202 along the first region 232 located between the bottom end 206 and the first crease 230. The beads of adhesive 238, 240, 242 on the outside surface are mirror images of the beads of adhesive on the inside surface.

Figure 2C:
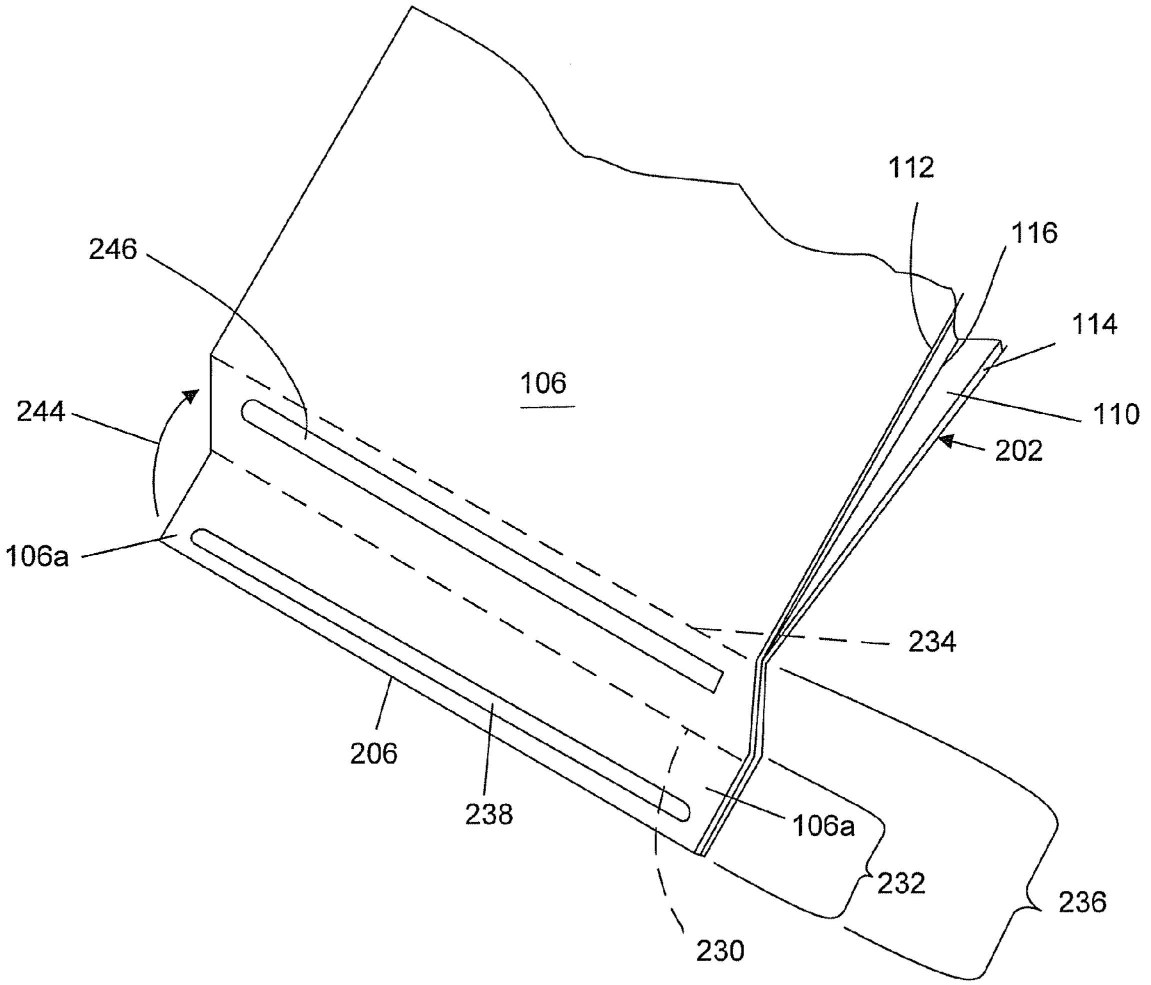
FIG. 2C is a schematic view of the bag disclosed by FIG. 2 at another stage of fabrication thereof.

In FIG. 2C, at least a portion of the first panel 106 within the first region 232 and at least a portion of the second panel 108 within the first region 232 are collapsed one on the other, flat and juxtaposed, and further, are held in place by the bead of adhesive 238 on the inside surface or interior of the bag. A portion of each side panel 110 within the first region 232 is flatly folded along the longitudinal folds, and is flatly disposed between the first panel 106 and the second panel 108. Corresponding beads of adhesive 240, 242 on the interior inside surface of the bag, within the first region 232 and at each side panel 110, hold the side panel 110 in place, flat and juxtaposed with the first panel 106 and the second panel 108. Preferably, the adhesive comprises a highly viscous, waterproof adhesive material. The applied adhesive holds the bottom end 20 in place, while collapsed and flat, and at least partially seals the bottom end 206 of the bag 202.

In FIG. 2C, a portion of each side panel 110 within the first region 232 is doubled back on itself by folding flatly along the gusset longitudinal fold 116, so as to be juxtaposed on itself. The beads of adhesive 240, 242 on the outside surface hold the side panel 110 in place, while doubled back and folded within the first region 232. The adhesive has a tear strength that is conducive to being elongated and torn by exerting manually applied force to spread apart and open the bottom end 206 of the bag 202. The tear strength of the adhesive is significantly less than that of each of the panels 106, 108, 110 to avoid tearing the panels when spreading apart and opening the bottom end 206. The adhesive remains tacky, such that the bottom end 206 can be opened and then closed repeatedly, each time to re-adhere the tacky adhesive.

In FIG. 2A, according to an embodiment of the invention, after the beads of adhesive 238, 240, 242 are locally applied, the bag 202 is severed along the second cut line 208 to separate the bag 202 from the continuous tube 100. According to an alternative embodiment, the beads of adhesive 238, 240, 242 are applied after the bag 202 has been separated from the continuous tube 100.

In FIG. 2C, at least the first region 232 of the bag 202 is collapsed flat, by folding along the longitudinal folds 112, 114, 116. In an alternative embodiment of the invention, the entire bag 202 is collapsed flat by folding entirely along the longitudinal folds 112, 114, 116. The locally applied beads of adhesive 238, 240, 242 hold the collapsed first region 232 in place, and at least partially seal the bottom end 206 of the bag 202, while the remainder of the bag 202 above the first region 232 is free of adhesive to spread apart and provide an open bag. In FIGS. 2A and 2C, the beads of adhesive 240, 242 adhere to each other and hold the folded flat and collapsed side panel 110 in place, while the remainder of the bag 202 above the first region 232 is free of adhesive to spread apart and provide an open bag.

Then, in FIG. 2C, a portion **106*a* of the first panel 106 within the second region 236 is doubled back on itself by pivoting the first region 232 in the direction of the arrow 244. Then the first region 232 is folded along the first crease 230, thereby juxtaposing and flattening the first region 232 against the doubled back portion 106*a* of the first panel 106. The bead of adhesive 238 on the exterior surface of the first region 232 holds the first region 232 in place, while flatly folded against the doubled back portion 106*a* of the first panel 106. Another bead of adhesive 246 is provided along the first panel 106 in the second region 236, such that, the beads of adhesive 238, 246 adhere to each other and hold the flatly folded first region 232 in place. The adhesive at all locations where applied hold juxtaposed surfaces of the bag 202 together. By doubling back the portion 106*a* of the first panel 106, a portion 108*a* of the second panel 108 is wrapped around and over the doubled back portion 106*a* of the first panel 106**.

Figure 3:
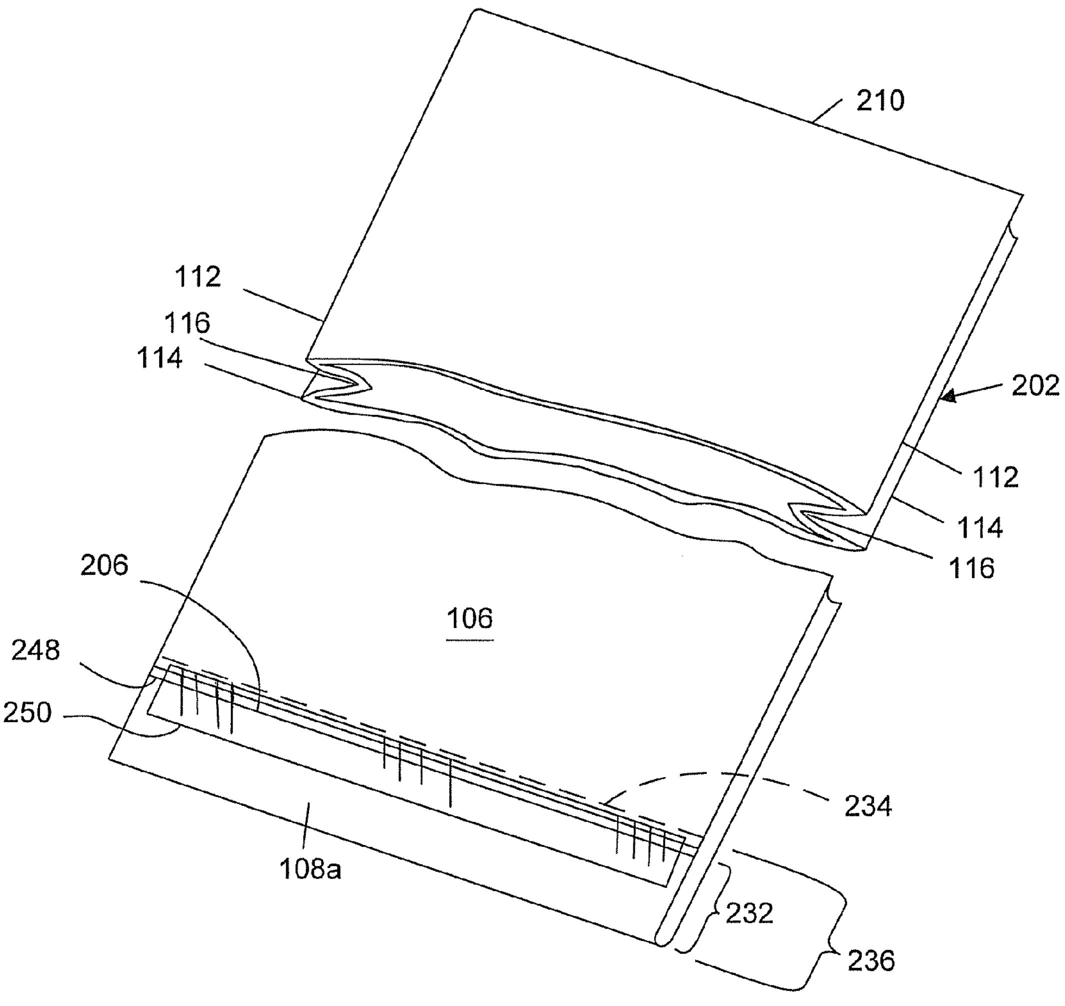
FIG. 3 is a schematic view of a bag ready for shipment.

FIG. 3 discloses the first region 232 flatly folded against a portion of the second region 236, wherein the first region 232 is held in place by the adhesive. Further, FIG. 3 discloses a combination of a tear strip 248 covered by a transparent adhesive tape 250. The adhesive tape 250 is applied to cover and seal the collapsed, flattened bottom end 206 of the bag 202. The adhesive tape 250 and tear strip 248 are applied such that the adhesive tape 250 is overlapping a portion of the first region 132 adjacent to the bottom end 206 of the bag 202, and is overlapping part of the doubled back or turned back portion **106*a* of the first panel 106 that is adjacent to the bottom end of the bag 202. The tear strip 248 has a portion exposed outward from under the adhesive tape 250 to be grasped and to tear through the adhesive tape 250 to expose the bag bottom end 206, and provide an open bag. Further details of the combination of a tear strip 248 and adhesive tape 250** as a tamper evident structure is disclosed by U.S. patent application Ser. No. 11/465,705, filed Aug. 18, 2006 and U.S. patent application Ser. No. 11/389,726, filed Aug. 16, 2007.

An embodiment of the tamper-evident structure comprises the adhesive tape 250 adhered to the foldable portion 232, and adhering to the first panel 106 while the foldable portion 132 is folded. In some embodiments, tamper-evident structure 18 comprises an adhesive tape 250 with or without a tear tape or tear strip 248. Tear strip 248 extends transversely across first panel 106 in the area of where a top portion of second panel 108 is folded over to first panel 106. In some embodiments, tear strip 248 extends from one edge fold 112 of first panel 106 to the other edge fold 112 of first panel 106 with at least one extension of tear strip 248 extending beyond one edge fold 112. Adhesive tape 250 extends transversely across first panel 106 and the first region 232 and directly over top of tear strip 248. In one embodiment, adhesive tape 250 extends at least from one edge fold 112 of first panel 102 to the other edge fold 112 of first panel 102 and does not extend past any extensions of tear strip 248. In another embodiment, the adhesive tape 250 and the tear strip 248 extend transversely across first panel 102 from at least one edge fold 112 to at least the other edge fold 112, and the adhesive tape 250 may be notched and/or sliced, either transversely or at the tear strip 248, so that the tear strip 248 may be accessible and easily torn away from the adhesive tape 250 by the end user. In some embodiments, the tamper-evident structure comprises an adhesive tape 250 and a tamper-evident, security device with or without a tear strip 248. One such tamper-evident, security device comprises a transferable substance that will leave a residue, such as, a visible stain, printed message or visible strip on the bag 202, when the adhesive side of the tape 248 is adhesively adhered against the bag 202. For example, such a transferable substance comprises a pigment, for example, an ink or powder pigment. Whenever the adhesive tape 250 is peeled away from the bag 202, the adhesive side of the tape 250 will delaminate from the bag 202. However, at least a portion of the transferable substance on the adhesive side of the tape 250 will have transferred onto the bag 202, and will remain as a residue on the bag 202 after the tape 250 has been peeled away, at least partially, which residue indicates in that the bag 202 has been opened. According to an alternative embodiment of the invention, a tamper-evident, security device comprises a hologram on the tape 250. Such tapes 250 having tamper-evident, security devices are commercially available from Payne, also known as, Payne P P Ltd., Nottingham, United Kingdom.

Figure 4:
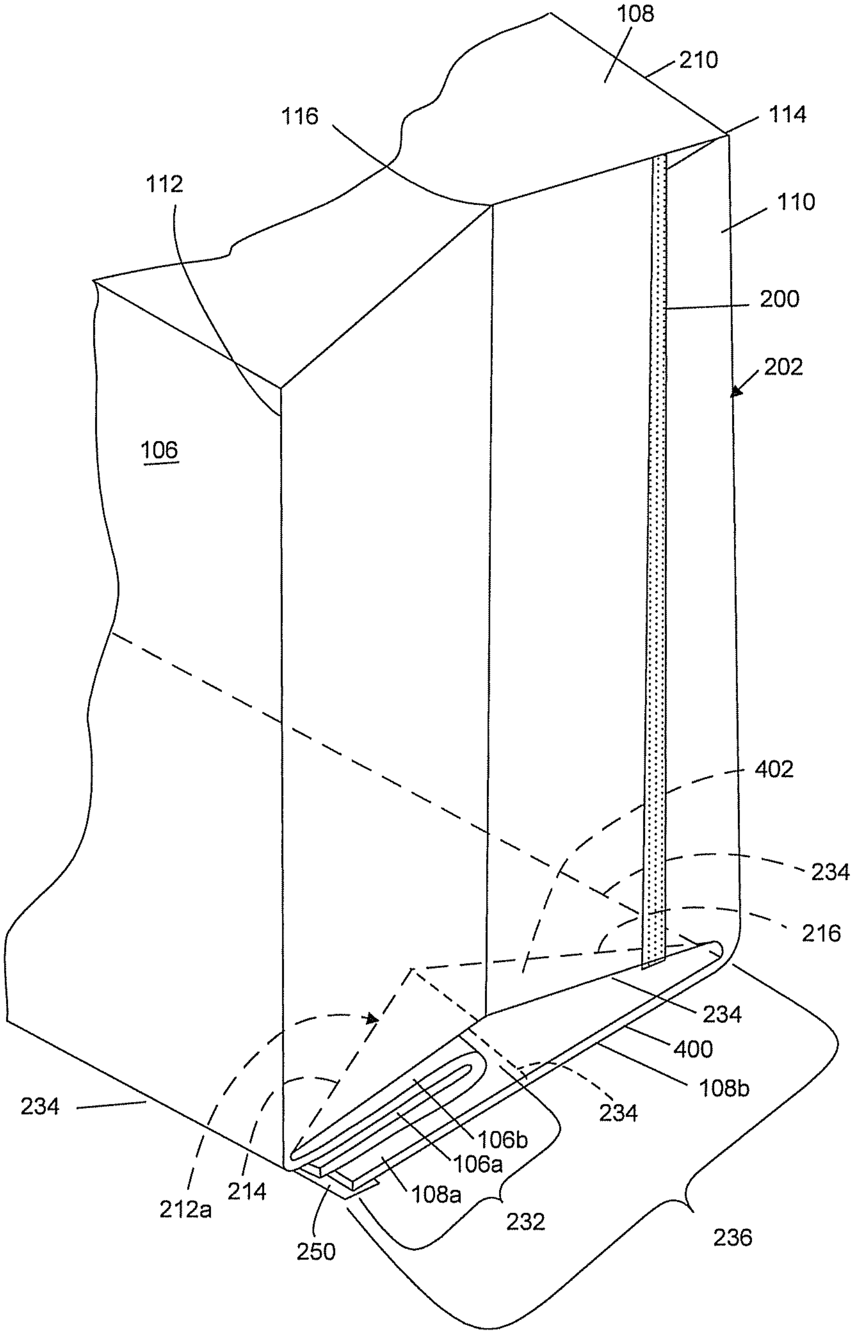
FIG. 4 is a schematic view of a bag deployed with an open top end and a flat bottom.

Further, FIG. 3 discloses the entire bag 202 in a process of being collapsed and flattened by flat folding along the longitudinal folds 112, 114, 116. The bag 202 is ready for being shipped to a first sale customer while fully flattened. In FIG. 3, the top end 210 of the bag 202 remains unsealed to be opened for filling the bag 202 with contents. The first sale customer deploys or expands the bag 202, as shown in FIG. 4, to spread apart and open the bag top end 210 and to fill the bag 202 with desired contents. The bag top end 210 is capable of being closed, with or without sealing the bag top end 210. In an alternative embodiment, as describe above, wherein the folding geometry 212 is adjacent to the bag top end 210, the first sale customer is provided a choice of closing the bag top end 210 similarly as the bag bottom end 206 is closed as described herein with reference to FIG. 2C or FIG. 3 or FIG. 4. A tamper evident structure is applied over the corresponding region 232 at the top 210 of the bag 202.

FIG. 4 discloses the bag 202 deployed or expanded. An open top end 210 is obtained by unfolding the longitudinal folds 112, 114, 116 of each gusseted side panel 110 and spreading apart the panels 106, 108, and each gusseted side panel 110. The bag 202 is further deployed or expanded by unfolding along the first transverse crease 234, such that the second region 236 extends as flat as possible, as shown in FIG. 4, to cover the flatly folded first region 232 and provide a flat bottom 400 of the bag 202. A feature of the bag 202 resides in a flat bottom 404 that deploys transversely perpendicular to the first panel 106, the second panel 108 and each gusseted side panel 110, for the bag 202 to stand upright while being bottom supported. The first panel 106, the second panel 108 and each gusseted side panel 110 extend perpendicular to the bottom 400 by turning them under and folding them, along the second transverse crease 234, wherein the second transverse crease 234 extends transversely across the first panel 106, the second panel 108 and each gusseted side panel 110. The portion 106*a* of the first panel 106 is turned under, together with another portion 106*b* of the first panel 106. The portion 108*a* of the second panel 108 is turned under, together with another portion 108*b* of the second panel 108, which forms the flat bottom 100.

FIG. 4 shows the gusseted side panel 110 partly turned under for purposes of illustration. When the gusseted side panel 110 is fully turned under and folded along the crease 234, the gusseted side panel 110 will extend further downward in FIG. 4.

In FIG. 4, the deployed or expanded bag 202 has each side panel 110 folded inwardly along the tuck forming geometry 212 on each gusseted side panel 110. The side panel 110 is folded inwardly along the first set of intersecting diagonal creases 214, 218, thereby forming folded triangular tucks 402. The tucks 402 lie flatly against the inside of the bottom 400 when the bag 202 is deployed or expanded. After filling the bag 202 with contents supplied through the top end 202, the top end 202 is closed, similarly as the bottom end 206, and the tamper evident structure is applied to the corresponding region 232 at the top end 210. Moreover, the top end 202 having the tamper evident structure will have an appearance similar to that of the closed bottom such that the adhesive tape 250 is overlapping a portion of the first region 132 adjacent to the top end 210 of the bag 202, and is overlapping part of a corresponding doubled back or turned back portion 106*a* of the first panel 106 that is adjacent to the top end 210 of the bag 202.

According to an embodiment of the invention, a flat top of the bag is formed by the panels 106 and 108 being spread apart from one another, turned under along the second transverse crease 234, and folded along the second transverse crease 234.

Another feature of the invention resides in the seamless second region 236 providing a seamless bottom 400 of the bag 202. The bag 202 while containing its contents is capable of being slid along the bottom 400, unimpeded by, and without risk of damage to, a seam 200. Accordingly, the seamless bottom 400 provides a continuous surface for displaying printed graphics. When multiple bags 202 are stacked one on the other, their seamless bottoms 400 are stacked in coplanar relationship to provide a billboard display.

The patents and patent applications referred to herein are expressly incorporated in their entirety by reference herein. This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A flat bag, comprising:

a first panel, a second panel and gusseted side panels, wherein each side panel joins the first panel and the second panel along respective longitudinal folds;

each side panel having a center gusset fold;

each side panel having a tuck forming, folding geometry with folds intersecting at junctions with the longitudinal folds, and intersecting at an apex along the center gusset fold;

a first region of the bag being flattened, wherein the first region extends between a bottom end of the bag and a first transverse crease, the first transverse crease extending in the first panel, the second panel and the gusseted side panels and intersecting approximately the aforesaid apex along the center gusset fold;

a second region of the bag being flattened and extending between the bottom end of the bag and a second transverse crease;

a flat bottom of the bag provided by the aforesaid second transverse crease extending transversely across the first panel, the side panel and each gusseted side panel and intersecting approximately said respective aforesaid junctions with the longitudinal folds;

a turned back portion of the first panel in the second region being turned back on itself and folded along the first transverse crease;

the first region being pivoted and flattened against the turned back portion of the first panel, and the turned back portion of the first panel being attached to the bag with adhesive.

2. The bag of claim 1, comprising:

a quantity of an adhesive on an interior of the bag along the first region holding the first region flattened, wherein the adhesive has a tear strength substantially less than that of the panels.

3. The bag as in claim 1, comprising:

the panels being folded along the second transverse crease.

4. The bag as in claim 3, comprising:

a quantity of an adhesive on an exterior of the first region holding the first region in place juxtaposed and flattened against a portion of the second region, wherein the adhesive has a tear strength substantially less than that of the panels.

5. The bag as in claim 3, comprising:

each tuck forming, folding geometry being turned under along the second transverse crease and folded to lie flatly against an inside bottom of the bag.

6. The bag as in claim 3, comprising:

the tuck forming geometry having another apex and fold lines extending from said another apex to the junctions.

7. The bag as in claim 3, comprising:

an adhesive tape and a tear strip overlapping a portion of the first region at the bottom end of the bag and overlapping part of the turned back portion of the first panel.

8. A flat bag, comprising:

a first panel, a second panel and gusseted side panels, wherein each side panel joins the first panel and the second panel along respective longitudinal folds;

each side panel having a center gusset fold;

each side panel having a tuck forming, folding geometry adjacent to the end of the bag;

each tuck forming, folding geometry having folds intersecting at junctions with the longitudinal folds, and intersecting at an apex along the center gusset fold, a first region of the bag extending between the end of the bag and a first transverse crease, the aforesaid first transverse crease intersecting approximately the aforesaid apex along the center gusset fold, and the aforesaid first transverse crease extending in the first panel, the second panel and the gusseted side panels, and a second region of the bag extending between the end of the bag and a second transverse crease, and a flat bottom of the bag provided by the aforesaid second transverse crease intersecting approximately the respective junctions with the longitudinal folds, and the aforesaid second crease extending transversely across the first panel, the side panel and each gusseted side panel;

a turned back portion of the first panel in the second region being turned back on itself and attached with adhesive, and being folded along the first transverse crease, the first region being pivoted and flattened against the turned back portion of the first panel; and a tamper evident structure having an adhesive tape with or without a tear strip, or an adhesive tape with a tamper evident security device and with or without a tear strip, wherein the adhesive tape overlaps a portion of the first region at the end of the bag and overlaps part of a turned back portion of the bag.

9. The bag of claim 8 wherein the bag is a woven bag.

10. The bag of claim 8 wherein the end of the bag is a top end of the bag.

11. The bag of claim 10 wherein the bottom end is covered with another tamper evident structure having an adhesive tape with or without a tear strip, or an adhesive tape with a tamper evident security device and with or without a tear strip, wherein the adhesive tape overlaps a portion of the first region at the end of the bag and overlaps part of a turned back portion of the bag.

12. The bag of claim 8 wherein the end of the bag is a bottom end of the bag.

13. The bag of claim 12 wherein the bag is a woven bag.

14. A method of making a bag having a first panel, a second panel and gusseted side panels, comprising:

scoring each side panel to have a tuck forming, folding geometry with first folds intersecting at junctions with longitudinal folds of the side panel, and having an apex intersecting a center gusset fold of the side panel;

scoring the bag transversely with a first transverse crease intersecting approximately the aforesaid first apex intersecting the center gusset fold of the side panel, and extending transversely across the first panel, the side panel and each gusseted side panel, and with a second transverse crease providing the bag with a folded flat bottom having the aforesaid second transverse crease intersecting approximately said respective aforesaid junctions with the longitudinal folds, and having the aforesaid second crease extending transversely across the first panel, the side panel and each gusseted side panel;

flattening a first region of the bag, wherein the first region extends between a bottom end of the bag and the first transverse crease;

pivoting the first region and turning back a portion of the first panel on itself; and folding along the aforesaid first transverse crease and attaching said portion of the first region to the first panel with adhesive to provide a flat folded bag.

15. The method of claim 14, comprising:

cutting transversely a tube to provide the bottom end of the bag, wherein the tube comprises the first panel, the second panel and the gusseted side panels; and cutting transversely the tube to provide a top end of the bag prior to scoring the bag.

16. The method of claim 14, comprising:

cutting transversely a tube to provide the bottom end of the bag, wherein the tube comprises the first panel, the second panel and the gusseted side panels; and cutting transversely the tube after scoring the bag to provide a top end of the bag.

17. The method of claim 16, comprising:

applying a quantity of an adhesive on an interior of the bag along the first region holding the first region flattened, wherein the adhesive has a tear strength substantially less than that of the panels.

18. The method of claim 14, comprising:

applying a quantity of the adhesive on an exterior of the first region holding the first region in place juxtaposed and flattened against a portion of the second region, wherein the adhesive has a tear strength substantially less than that of the panels.

19. The method of claim 14, comprising:

applying an adhesive tape and a tear strip to overlap a portion of the first region at the bottom end of the bag and to overlap part of the turned back portion of the first panel.

20. The method of claim 19, comprising:

applying a quantity of the adhesive on the first region holding the first region in place juxtaposed and flattened against a portion of the second region, wherein the adhesive has a tear strength substantially less than that of the panels.

21. The method of claim 14, comprising: folding along the transverse crease.

* * * * *